June 4, 1968    C. J. SWARTWOUT ET AL    3,387,266
ELECTRONIC PROCESS CONTROL SYSTEM
Filed Oct. 14, 1963    2 Sheets-Sheet 2

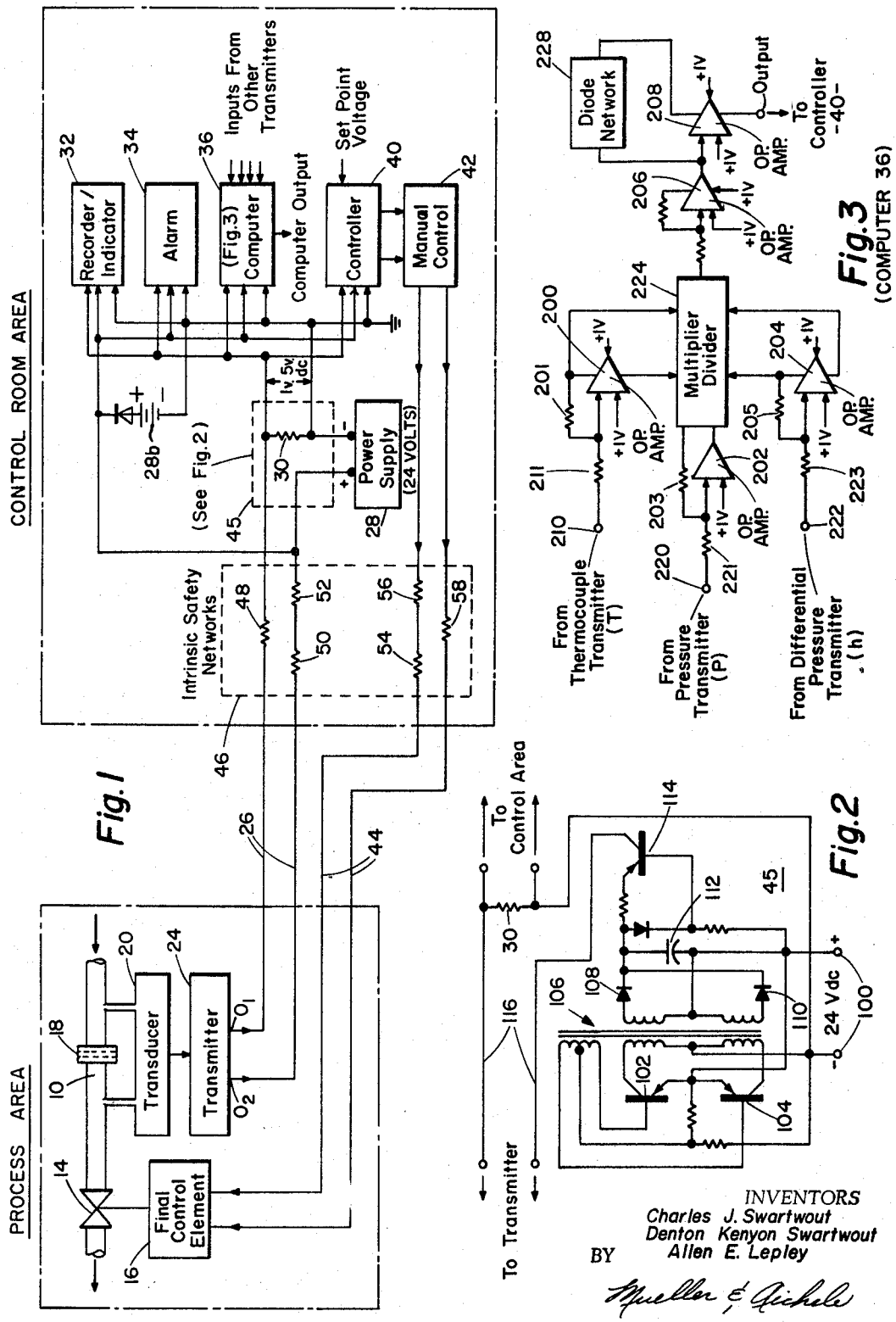

INVENTORS
Charles J. Swartwout
Denton Kenyon Swartwout
Allen E. Lepley

BY

ATTY'S.

United States Patent Office 3,387,266
Patented June 4, 1968

3,387,266
ELECTRONIC PROCESS CONTROL SYSTEM
Charles J. Swartwout, Scottsdale, Denton Kenyon
Swartwout, Phoenix, and Allen E. Lepley, Scottsdale, Ariz., assignors to Motorola, Inc., Chicago,
Ill., a corporation of Illinois
Filed Oct. 14, 1963, Ser. No. 315,940
11 Claims. (Cl. 340—150)

ABSTRACT OF THE DISCLOSURE

A process control and monitoring system including a two wire connection between a control room area and a process area wherein the power supply in the control rooms supplies a current through the two wires in a series loop circuit, the amplitude of the current being modified by a transducer unit in the process area for indicating status of the process. A series electrical impedance is provided in the series loop circuit across which a voltage is developed indicating the status of the process to utilization means in the control room area. Resistors are provided in a series with the two wire conductors providing an intrinsically safe system. Connections are provided at the process area and the control room area for providing voice communication over the same two wires. Two wires are also used to distribute power from the control room area to the process area transducer. Standby batteries are provided in the power supply for emergency power.

The present invention relates to electronic automatic control systems, and it relates more particularly to an improved electronic automatic control system which is particularly suited for controlling industrial processes.

Automatic control systems for industrial processes have been known for some time. These systems originally were pneumatic. However, in recent years electronic techniques have been applied to the systems.

Industrial process control systems are utilized generally to regulate one or more instrumentalities in an industrial plant, or other facility, in response to changes in one or more variables in the processes carried out in the plant. The system to be described, for example, controls the flow of fluid through a pipeline in response to variations in the fluid flow in the line, and (in some cases) to variations of other parameters. However, it will become evident as the description proceeds that the system of the invention has general application in the control of a wide range of industrial processes, and the like.

In general, the system of the invention responds to an electric input signal furnished, for example, by a condition-sensing device associated with the process to be controlled; and it produces a corresponding electric output signal for transmission, for example, to a control valve, likewise associated with the process.

The above-mentioned condition-sensing device and an associated transmitter are located in the process area. An electric signal representing variations of the sensing device is transmitted by the transmitter to appropriate control and indicator units which are included in the control system. These latter units are usually located in a control room area remote from the process area. The signal from the transmitter is processed by the units in the control room area, and a control signal is sent back to a control actuator in the process area so as to control, for example, the aforementioned process control valve.

The control system of the present invention is of the continuous control type, rather than of the "high-low," or intermittent type. That is, the control system of the invention responds to variations of the particular variable in the controlled process to provide a continuous control on the corresponding control-exerting instrumentality in the process.

The system of the invention is of the two-wire type, in that it requires but two wires between the process area transmitter and the control room area, and two wires between the control room area and the control device in the process area. The power supply for the system is located in the control room, and the two-wire connection between the transmitter and the control room carries not only the signal information, but also the direct current excitation for the transmitter.

Two-wire transmission systems between a process control transmitter and an associated control room area are known to the art. However, such two-wire transmission systems in the past have required that various units in the control room area be connected in series into the control system.

Therefore, although such prior art systems have the advantage of two-wire transmission between the transmitter and the control room, they have a disadvantage in that failure of any one of the control room units in the series loop can cause failure in the entire system. Also, system flexibility is impaired because of the difficulties involved in adding or removing additional units to or from the series loop.

Because of the inherent difficulties and disadvantages of the prior art two-wire series loop system, many prior art process control systems use a parallel, rather than a series loop. However, the prior art systems of the parallel loop type require four wires to carry the signal information and the direct current excitation between the transmitter in the process area and the units in the control room.

The parallel loop prior art system, however, does have the advantage in that the system is flexible, and is particularly reliable in its operation. The parallel loop system is flexible because units can be added or removed from the system without interfering with the operation of the other units. It should be noted, of course, that in the parallel loop system, all units must be of sufficiently high impedance so that they will not unduly load the signal circuits.

The improved industrial process control system of the present invention, in the embodiment to be described, is actually a combination of the series type and parallel type systems described above. The system of the invention is so conceived that it exhibits all the advantages peculiar to the two types of prior art systems, and yet it has none of the disadvantages.

In the particular embodiment of the invention to be described, two-wire transmission is used between the process area transmitter and control room area in a series loop, and a 4–20 milliampere current, for example, is used in the loop. However, instead of the series loop extending through a series string of units in the control room area, as was the practice in the prior art, a precision resistor is connected into the loop in the control room.

Therefore, in the system of the invention, a voltage is developed across the precision resistor. All the control room units are connected in parallel across the precision resistor so that, insofar as these units are concerned, the system functions as a parallel type of voltage system, rather than a series type current system.

The control room units in the system of the invention should be of relatively high impedance, for the reasons noted above. Then, any one of the units can be added to or taken from the system without affecting the other components thereof. This, as noted above, tends to a high degree of system flexibility and reliability.

An object of the present invention, therefore, is to provide an improved industrial process control system which requires a minimum of connections between the components in the process area and the components in the control area, and yet which exhibits a high degree of flexibility.

Another object of the invention is to provide such a system which is constructed to be compatible with other systems of the same general type.

Another object of the invention is to provide such an improved control system which is relatively simple in its construction and yet which is extremely reliable in its operation.

A further object of the invention is to provide such an improved control system in which inter-connection wiring between the different components thereof is simplified.

Yet another object of the invention is to provide an industrial process control system which is intrinsically safe and which does not require an explosion proof housing for the equipment in the process area even though operated under hazardous ambient conditions.

A feature of the invention is the provision of an industrial process control system which utilizes a series loop two-wire current carrying system between the transmitter in the process area and the control room area, and which uses a parallel voltage type of circuit in the control room area for the various units located therein.

Another feature of the invention is the provision in the control room area of a common ground line for all components, with all the signals in the system being of one polarity with respect to the common ground line, so as to simplify the inter-connection wiring between the components in the control room area, since one wire only is needed to introduce the input signal to the different units.

Another feature of the invention is the provision of a common single-polarity direct current power supply in the control room area for supplying the direct current exciting power to all the components of the system; the power supply being referenced, for example, to the aforementioned ground level and there being no requirement for multi-polarity or floating power supplies.

Yet another feature of the invention is the provision of a system which can be readily rendered compatible with different transmitter types, merely by incorporating simple adapter networks into the system corresponding to the type of transmitters.

The industrial process control system to be described is of the "elevated zero" type. That is, the direct current signal voltage in the system varies, for example, in a range of 1–5 volts, with respect to ground, rather than between 0 and 4 volts. The elevated zero type of system is well known to the art, and its advantages over the zero based signal system are well understood. The elevated zero system is virtually a requirement for the two-wire type of system of the present invention.

In some instances it is necessary to include an analog computer in the system. The need for such a computer arises, where the actual instrumentality is to be controlled in accordance with the variations of several variables, and in accordance with predetermined relationships between the variables. The computer is utilized to provide the desired computations, so that the appropriate control signal for the instrumentality may be derived. However, when a usual prior art general purpose analog computer is used, certain difficulties arise in the elevated zero type of system. This is because the usual prior art general purpose computers are constructed to utilize zero based signals.

Another feature of the present invention is the provision in an elevated zero system of a special purpose computer especially adapted to respond to elevated zero signals.

A still further feature of the invention is the provision of a built-in communication circuit in the industrial control system. As will be described, a test jack circuit is provided in the transmitter of the embodiment to be described, and this circuit may serve as a plug-in point for voice communication between the process area and the control room.

Other objects, advantages and features of the invention will become apparent from a consideration of the following specification, when the specification is taken in conjunction with the accompanying drawings, in which:

FIGURE 1 is a schematic representation, partly in block form, showing an industrial process control system constructed in accordance with the concepts of the present invention;

FIGURE 2 is a circuit diagram of a conversion network which may be incorporated into the system of FIGURE 1 to adapt the system to operate in conjunction with different types of transmitters;

FIGURE 3 is a schematic representation of the various components of a computer incorporated into the system of FIGURE 1;

Figure 5:
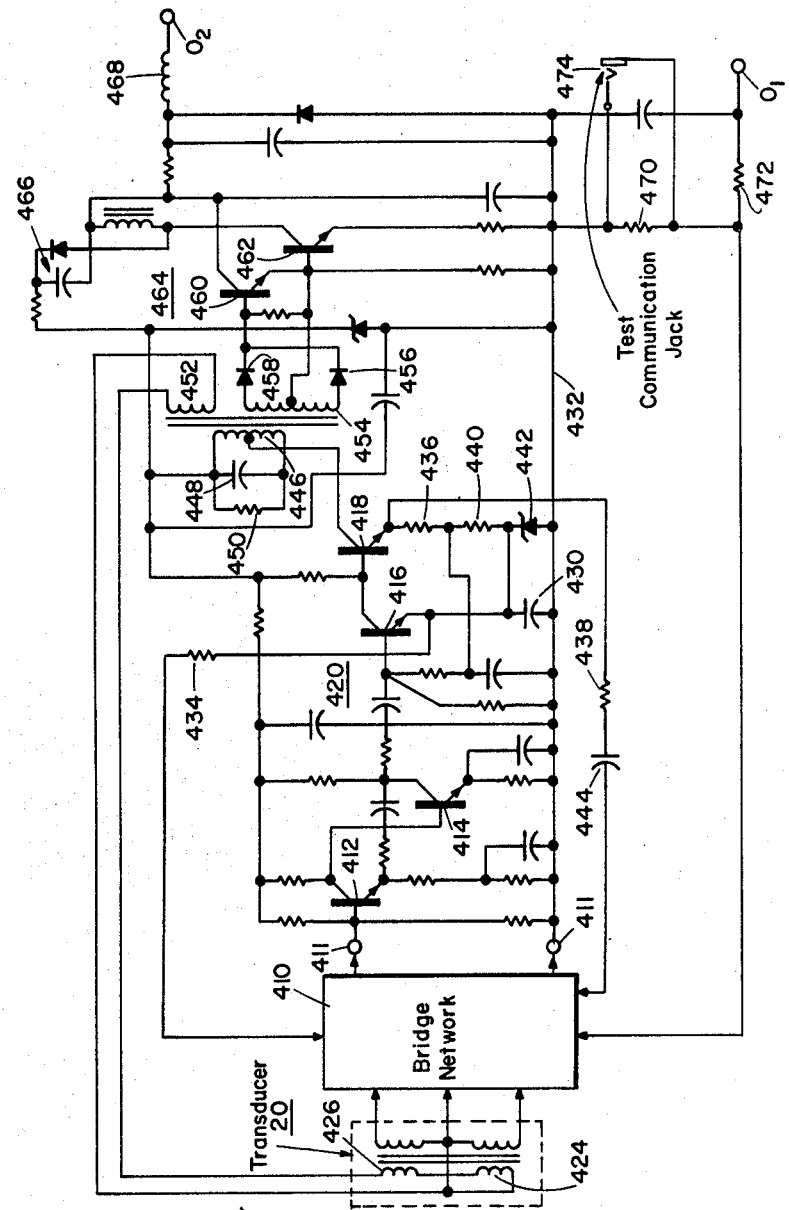
FIGURE 5 is a diagram, partly in block form and partly in circuit detail, and representative of an appropriate system appropriate for use in a transmitter unit incorporated into the system of FIGURE 1.

As mentioned above, the industrial control system with which the present invention is concerned includes certain components in the process area, and other components in a central control room area. The various process instrumentalities, to be controlled by the system, are located in the process area.

In the embodiment of FIGURE 1, the illustrated process control system is used to sense the rate of flow of a fluid in a pipeline 10, and to control the flow of fluid in the pipeline in response to such sensing. The latter control is effectuated, for example, by a known type of valve 14. The control system of the invention responds to changes in the rate of flow of a liquid or gas in the pipeline 10 so as to maintain the rate of flow at a particular established value.

In accordance with know practice, an orifice unit 18 is provided in the pipeline 10, and the resulting differential pressure across the orifice is sensed by a transducer 20. This differential pressure is a function of the fluid flow, so that the electrical output signal developed by the transducer is a measure of the rate of fluid flow in the pipeline 10. The differential pressure transducer 20 may be of the type disclosed and claimed, for example, in copending application, Prell, Ser. No. 315,821, filed Oct. 14, 1963, now Patent 3,277,719, and commonly assigned.

It is to be understood, of course, that the control system of FIGURE 1 is ilustrated as controlling fluid flow merely by way of example. The control system, of course, may be used to respond to other variables and to control other instrumentalities.

The differential-pressure transducer 20 is coupled to a transmitter 24. The circuit of the transmitter 24 is illustrated in some detail in FIGURE 5. This transmitter may be similar to the system described and claimed in copending application, Miller et al., Ser. No. 315,997, filed Oct. 14, 1963, and commonly assigned. Also, the circuit of the transmitter 24 may include a voltage boost network, such as described in copending application, Oliver, Ser. No. 316,033, filed Oct. 14, 1963, now abandoned, and commonly assigned.

The transmitter 24 has a pair of output terminals $O_1$ and $O_2$. These output terminals are connected to various components of the system in the control room area by means of a two-wire connection designated 26. These wires 26 extend from the process area to the control room area, as shown in FIGURE 1.

The wires 26 form a series loop current-carrying system extending to the transmitter 24 in the process area, and including a power supply 28 and a precision resistor 30 in the control room area. The resistor 30 is connected to the negative side of the power supply 28 which is grounded.

The series loop in a constructed embodiment of the invention is designed to draw from 4 to 20 milliamperes direct current from the power supply 28. Also, the power supply 28 has a 24-volt source in the constructed embodiment. The precision resistor 30 has a resistance of 250 ohms in the constructed embodiment.

The power supply 28 constitutes the common power supply for the transmitter 24, and for the various units included in the control room area. The leads 26 carry the direct current excitation power from the power supply 28 to the transmitter 24, and these wires also carry the signals from the transmitter to the control room area.

The control room area is a centralized facility, which may be located adjacent or remote from the process area. The control exerted on the controlled variable, such as the rate of flow of the fluid in the pipeline 10, is of a continuous nature, as will be described.

The power supply 28 provides power for a plurality of units in the control room area over line 29, as mentioned above. The system is flexible, and more or less units than those illustrated in FIGURE 1 may be used. In the embodiment of FIGURE 1, for example, a recorder/indicator 32 indicates the amplitude of the signal from the transmitter 24 at any instant, and also makes a continuous responds to all the signals from the different transmitters.

An alarm unit 34 may also be included, and this alarm may be a flashing light or an audible alarm. The alarm 34 responds to any variations in the signal from the transmitter beyond preset limits.

The system in the control room area may also include a computer 36. This computer is included in the more complex type of systems, in which the actual control of the valve 14 is not merely in accordance with changes in the rate of flow of the fluid in the pipeline 10, but also in accordance with variations of other parameters.

For example, transmitters similar to the transmitter 24 may be controlled to supply other signals to the control room area indicative, for example, of pressure variations, temperature variations, and the like. The computer 36 responds to all the signals from the different transmitters, and it performs predetermined computations on the signals so as to supply an appropriate output to a controller 40. The analog computer 36 may be replaced, for example, by a general purpose digital computer in a completely automated process control system.

The controller 40 is coupled to a manual control 42, and the resulting output is returned to the process area over a pair of wires 44. The wires 44 are coupled to a final control element 16 in the process area. The control element 16 responds to the control signals on the wires 44 to operate the valve 14.

Control elements, such as the element 16 illustrated in FIGURE 1, which respond to electrical input signals to control valves in pipelines, or other instruments, are well known to the art. Such units, per se, form no part of the present invention. For that reason, the details of the control element 16 will not be described in detail herein.

It is to be noted that the power supply 28 constitutes the common power supply for the units 32, 34, 36 and 40 in the control room area. Also, the power is supplied to these units from the power supply by use of a common ground line. As mentioned above, this simplifies the connections to the different units in the control room area, and it gives greater system flexibility. With such a system, there are no problems of lead polarity within an instrument, or between the panel instruments in the system.

Inter-connections for the more involved control systems in the control room area are thereby simplified. Inter-connections are achieved, for example, by connecting a single wire from a terminal of one unit in the control room area to a terminal of another. In addition, all signals have a single polarity referenced to the ground lead, and the system does not involve negative power supplies or floating power supplies.

The use of the common power supply 28 in the system of FIGURE 1 is in contrast with the usual prior art systems in which separate power supplies are provided for each of the different components in the control room area.

As mentioned above, the system of FIGURE 1, in a constructed embodiment, operates on 24-volt direct current power developed by the power supply 28. The power supply 28 may be energized from the usual unregulated 105–130 volt alternating current power source (not shown). The transmitter 24, in the constructed embodiment, operates on a 4–20 milliampere, 24-volt signal. The resistor 30 converts the signal into an elevated zero 1–5 volt direct current signal.

The precision resistor 30 is illustrated in FIGURE 1 as enclosed in a rectangle 45. The circuit in the rectangle may be replaced by the circuit of FIGURE 2, when so desired, in order to adapt the equipment in the control room area for operation with transmitters 24 of different types. As mentioned above, the system of FIGURE 1 operates with a single pair of wires 26 between the transmitter and control room area, and no additional power sources are interposed between the control room equipment and the transmitter.

The system of FIGURE 1 includes intrinsic safety networks which are mounted in the control room area. These networks are illustrated in FIGURE 1 as enclosed in a rectangle 46. The safety networks include a series resistor 48 in one of the wires 26, the resistor 48 being connected to the precision resistor 30. The safety network also includes a pair of series resistors 50 and 52 in the other wire 26, the latter resistors being connected to the positive terminal of the power supply 28.

The intrinsic safety networks also include a pair of series resistors 54 and 56 connected in one of the wires 44, and a further resistor 58 is connected in the other wire 44. The resistors 48, 50, 52, 54, 56 and 58 may each have a resistance, for example, of 60 ohms.

The concept of intrinsic safety is predicated upon the restriction of electrical energy levels, under normal or abnormal conditions, to a point well below that which could produce an explosion-igniting arc in hazardous atmospheres. Intrinsic safety is, therefore, dependent on the circuit design, rather than upon arc-containing explosion-proof enclosures, or other external protective measures.

The safety resistors in the rectangle 46 function as current limiting resistors, and they serve to hold the current in the control system below the danger level, even though faults may occur in the system. The safety resistors are mounted in a manner such that it is impossible inadvertently to by-pass them in making circuit connections. Moreover, these protective resistors are constructed such that they themselves cannot fail towards lower resistance. Ceramic cores and casings were utilized in a particular construction, with the resistance wires being spirally wound on the cores with no cross-overs.

The "hot" wires of the pairs 26 and 44 each include two series-connected safety resistors (50 and 52, 54 and 56). Therefore, if any one of the resistors in either pair should fail to a lower resistance value, an eventuality which in itself is virtually impossible, the other resistor of the pair would still be effective.

Therefore, in the system of FIGURE 1, any variation in the rate of fluid flow in the pipeline 10 is indicated by a corresponding change in differential pressure across the orifice 18. Such a change is sensed by the transducer 20, and this causes the transmitter 24 to vary the amplitude of the direct current flowing in the wires 26. This variation in the direct current flow produces a corresponding variation in the voltage across the precision resistor 30. The variation is indicated and recorded by the recorder/indicator 32. If the variation exceeds a predetermined limit, the alarm 34 is actuated.

The computer 36 responds to the aforesaid variation, in conjunction with inputs from other transmitters, to provide a signal for the controller 40. The manual control 42 is provided to enable the process to be controlled manually from the control room, if so desired.

As mentioned above, the system of FIGURE 1 is advantageous in that the series loop concept is used between the process area transmitter 24 and the control room area, so that a two-wire system may be employed. However, in the control room area itself, a parallel arrangement of the various units is utilized, for flexibility, so that the various units may be inserted into the system, or removed from the system, without affecting the operation of the over-all system itself. Also, a common power supply 28, together with a common ground line is used for all the units in the control room area, and for the transmitter 24. In addition, the system is made intrinsically safe, by the inclusion of the resistors in the rectangle 46.

The power supply 28 in the simplest case may be a single DC supply for connection to an external power source. However, the power supply can also include batteries or battery 28B for automatically supplying standby power in event of a failure of the external power source. The batteries can be connected to the supply circuit by a diode (not shown) which transfers power to the system from the batteries whenever the normal supply voltage decreases. The automatic standby power is a feature of the system which is made practical by the use of a common power supply which is the only source of power for the system.

As mentioned, the system of FIGURE 1 may be quickly adapted for use with transmitters other than the particular transmitter described above. Many of the different types of process control transmitters presently known to the art use different currents, but generally the current limits are of the same 5–1 ratio as the particular transmitter described above. For example, prior art units are available which operate on 1–5 milliamperes, or 10–50 milliamperes. Therefore, both of these can be converted to the 1–5 volt elevated zero signal for application to the control units of the control room area.

The circuit of FIGURE 2 includes a pair of input terminals 100 which are connected across the power supply 28, when the circuit is plugged into the system, in place of the original precision resistor 30 of FIGURE 1. Line 29 is connected as shown for making power connections from source 28 to utilization means 32, 34, 36, 40, and 42.

The input terminals 100 are connected to a transistor circuit which includes a pair of transistors 102 and 104, and a transformer 106. The transistors 102 and 104 are connected in a usual 2-transistor multivibrator circuit, and this circuit operates, for example, at approximately 10 kilocycles.

The output from the above-mentioned multivibrator appears across the secondary winding of the transformer 106, and this output is rectified by a full-wave rectifier. The full-wave rectifier includes a pair of diodes 108 and 110. The rectified voltage is filtered by a filter capacitor 112.

The resulting rectified and filtered direct current output voltage is passed through a current limiter circuit including a transistor 114. This current limiter circuit is used to prevent damage to the unit in case the output leads 116 to the transmitter should become short-circuited. The signal current is passed through the precision resistor 30 which converts the current into the elevated zero 1–5 volt direct current signal required in the control room area.

The adapter circuit of FIGURE 2 may be mounted in an individual housing, and different adapter units may be supplied corresponding to the different types of transmitters. Then, should the control room area equipment be used in conjunction with any particular type of transmitter, the adapter unit appropriate to that transmitter is plugged into the system.

The circuit of FIGURE 2, therefore, supplies the proper power supply voltage for a particular transmitter operation, and it adapts the signal current range of the particular transmitter to the 1–5 volt direct current voltage range for the control room equipment.

The computer 36 in the control room area may incorporate a plurality of operational amplifiers, designated 200, 202, 204, 206 and 208 in FIGURE 3. These amplifiers may be of the type described and claimed in copending application, Weberg, Ser. No. 315,942, filed Oct. 14, 1963, and commonly assigned.

As described in the copending Weberg case, the computer 36 is a special purpose analog computer which is especially constructed to respond to elevated zero signals. The computer includes an input terminal 210 which receives signals indicative of temperature from a thermocouple controlled transmitter, for example, in the process area. The input terminal 220 of the computer, on the other hand, may receive an input terminal indicative of pressure from a pressure controlled transmitter in the process area; and the input terminal 222 may receive an input signal representative of the rate of flow of a fluid from, for example, the differential pressure controlled transmitter 24 in FIGURE 1.

As noted, the computer 36 responds to the signals from the different transmitters, and it performs predetermined calculations based on those signals so that appropriate control signals can be developed. These control signals serve to control the rate of flow of the fluid in the pipeline 10, for example.

The input terminals 210, 220 and 222 of the computer 36 are connected through respective resistors 211, 221 and 223 to corresponding ones of the operational amplifiers 200, 202 and 204. The amplifiers also include respective feedback resistors 201, 203 and 205. The gain is sufficiently high so that the action of the amplifiers depends upon the values of the illustrated input and feedback resistors.

The amplifiers 200, 202 and 204 may be constructed in accordance with the concepts described in the copending application, Weberg, Ser. No. 315,942, filed Oct. 14, 1963, and commonly assigned. In that event, each of the amplifiers can be controlled to establish signals referenced, for example, to 1 volt, in response to the elevated zero signals appearing across the resistor 30. In this manner, the signals in the 1–5 volt elevated zero range can be processed without requiring the subtraction of live zero (+1) volt from all inputs, as would be the case when the usual prior art general purpose computer is used. Also, and as pointed out in the copending application, the +1 volt source for the amplifiers supplies no power and may be common to all.

The amplifiers 200, 202 and 204 include output terminals at which the corresponding outputs appear in inverted and non-inverted form. The output circuits of the different amplifiers are also established at the 1-volt reference.

The outputs of the amplifiers 200, 202 and 204 are applied to a multiplier-divider computing network 224. The network 224 performs certain computing operations on the signals from the amplifiers, so that a desired result may be effected. The output from the network 224 is passed through the operational amplifier 206 to the amplifier 208. These latter amplifiers may also be constructed in accordance with the concepts described in the copending application of Weberg, supra. The amplifier 208 includes a diode feedback network 228, in a particular embodiment of the computer 36, so that a desired square root computation may be made. The resulting output from the amplifier 208 is applied to the controller 40.

Figure 4:
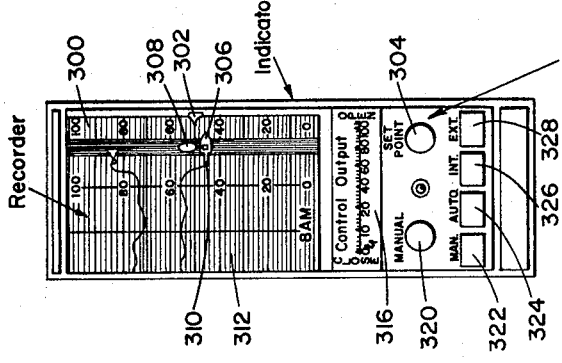
FIGURE 4 is a combined controller and indicator/recorder unit which may be incorporated into the system.

The controller unit 40, and the recorder/indicator unit 32 may be combined in a common housing, as shown in FIGURE 4. The resulting assembly includes an indicator scale 300, and a set point dial pointer 302 is movable across the scale 300 to a selected set point, under the control of a set point control knob 304. A second dial pointer 306 is movable up and down the scale 300, under the control of the direct current signal across the resistor 30. An indicator light 308 may be provided in the assembly, and this light changes color for indicating purposes, as the displacement between the two dial pointers 302 and 306 varies.

A usual marking pen 310 may be mounted on the dial pointer 306, and this pen moves across a usual recording paper 312 in the recorder portion of the instrument. The instrument may also include a control signal output meter 316 which indicates the control output current flowing in the leads 44 to the final control element 16 in FIGURE 1.

The particular control exerted by the unit of FIGURE 4 may be changed from automatic to manual, first by depressing a manual control knob 320. This removes the control signal output meter 316 from the still-active automatic-control circuit and places the meter in the manual control circuit. By rotatably adjusting the control knob 320, the operator can then set the control output meter to the previously indicated automatic value. Then, by depressing a push button 322 which is labelled "Manual," the system is placed on manual control, and further manual controls can be made. The abovedescribed operations permit the transfer from automatic to manual control to be made without "bumps" or "lapses."

The push button 322 is illuminated whenever the recorder-controller is in manual operation. This serves to remind the operator constantly of any units which are "off normal," that is, which are on manual rather than automatic control.

The transfer from the manual control to the automatic mode is easily accomplished. The operator simply lines up the set point dial pointer 302 with the recording-pen dial pointer 306, and then depresses a push button 324 which is labelled "Automatic."

Internal/external set point switching is also easily accomplished by the instrument of FIGURE 4. To switch the set point of the system from "external" to "internal," or vice versa, it is necessary only to adjust the set point for balance, and then actuate either an "internal" push button 326 or an "external" push button 328.

When the set point is to be balanced, the set point knob is depressed, so that the set point dial pointer 302 is removed from the control circuit, allowing adjustment to be effected without disturbing the controller operation. The "internal" push button 326 is illuminated whenever the controller is on an internal set point. As with the automatic/manual switching arrangement, the illuminated push button 326 indicates to the operator that the uniti is in an "off normal" funtcional mode, in this case, on "internal" instead of "external" set point.

The actual mechanical details of the instrument of FIGURE 4 form no part of the present invention, and for that reason will not be described.

The circuitry of the transmitter 24 may be similar to that described in the copending application, Miller, et al., Ser. No. 315,997, filed Oct. 14, 1963, and commonly assigned, and in copending application, Oliver, Ser. No. 316,033, filed Oct. 14, 1963, now abandoned, and commonly assigned. For purposes of understanding the system of the invention, the circuitry described in the copending application, Oliver, Ser. No. 316,033, filed Oct. 14, 1963, now abandoned, and commonly assigned, is shown in FIGURE 5.

The transmitter 24 includes a bridge network, designated by the block 410. This bridge network is described in more detail in the copending application, Miller et al., Ser. No. 315,997, filed Oct. 14, 1963, and commonly assigned. The bridge network is coupled by a pair of terminals 411 to the input of an NPN transistor 412. The NPN transistor 412, together with further NPN transistors 414, 416 and 418 form an amplifier 420. The amplifier 420 is an oscillating type, and it produces an output signal of a particular frequency. The output signal has an amplitude which varies in accordance with variations in the transducer 20.

As mentioned above, the transducer 20 may be of the type described in copending application, Prell, Ser. No. 315,821, filed Oct. 14, 1963, now Patent 3,277,719, and commonly assigned. This particular transducer includes a pair of stator windings 424 connected to the bridge network 410, and it further includes corresponding armature windings 426. Variations in the rate of fluid flow monitored by the transducer 20 produce corresponding variations in the inductive coupling between the windings 426 and 424.

The emitter of the transistor 416 is connected to a capacitor 430 which, in turn, is connected to the common amplifier lead 432. The capacitor 430 has a capacity, for example, of 15 microfarads. The emitter of the transistor 416 is also connected to a resistor 434. The resistor 434 is connected back to the bridge network 410 to supply a bias voltage to the bridge network, as explained in the copending application, Prell, Ser. No. 315,821, filed Oct. 14, 1963, now Patent 3,277,719, and commonly assigned. The resistor 434 may have a resistance, for example, of 100 ohms.

The collector of the transistor 416 is also connected to the base of the transistor 418. The emitter of the transistor 418 is connected to a resistor 436 and to a resistor 438. The resistor 436 may have a resistance, for example, of 9.65 ohms. The resistor 438 may have a resistance, for example, of 499 kilo-ohms. The resistor 436 is also connected to a resistor 440. The resistor 440 has a resistance, for example, of 2.5 kilo-ohms. It is connected to the cathode of a Zener diode 442. The cathode of the Zener diode is also connected to the capacitor 430 and to the resistor 434. The anode of the Zener diode is connected to the common lead 432.

The resistor 438 is connected to a capacitor 444. The capacitor 444 has a capacity of .047 microfarad, for example. It is connected back to the bridge network 410. The resistor 438 and capacitor 444 form a degenerative feedback path for the bridge network 410 for stabilizing purposes.

The collector of the transistor 418 is connected to a tap on an inductive winding 446. The winding 446 is shunted by a capacitor 448, and by a resistor 450. The capacitor 448 and the winding 446 form a parallel-resonant tank circuit. As mentioned above, the transmitter system is of the oscillating type, and the tank circuit is tuned to the oscillating frequency, this being 30 kilocycles in a constructed embodiment.

An inductive winding 452 is inductively coupled to the winding 446, and the inductive winding 452 is connected back to the windings 424 and 426 in the transducer 20. In this manner, the output signal of the amplifier is fed back to the input of the bridge 410 in regenerative phase, so that oscillations may be sustained in the transmitter system. The amplitude of the oscillations, as noted, depends upon the position of the armature windings 426 of the transducer 20 with respect to the stator windings 424, as the transducer senses the rate of fluid flow in the pipeline 10.

In the transmitter circuit thus far described, the oscillating output of the amplifier 420 is fed back to the input of the bridge 410 by the above-mentioned regenerative feedback circuit. This establishes an oscillatory condition in the system, the frequency of which is established by the parallel resonant tank circuit 446, 448.

The variations in the transducer windings 426 and 424 produce corresponding unbalances in the bridge 410, and these unbalances produce amplitude modulations in the oscillating signal output of the amplifier 420. Therefore, as noted, the output of the amplifier 420 is an alternating current signal, having an amplitude controlled by the transducer 20.

A winding 454 is inductively coupled to the inductive winding 446. The winding 454 is connected to the anodes of a pair of rectifying diodes 456 and 458. The cathodes of the diodes are connected together to the base of an NPN transistor 460. The transistor 460 and an NPN transistor 462 form a direct current amplifier 404.

The circuit of the diodes 456 and 458 is a full-wave rectifier, as explained in the copending application, Oliver, Ser. No. 316,033, filed Oct. 14, 1963, now abandoned, and commonly assigned. The circuit acts as a frequency doubler and serves to prevent any interaction between the output and input of the system. As also explained in the copending application, this same effect could be achieved by adequate shielding, and in some instances is not required.

The collector of the transistor 460 is connected to a voltage boost circuit 466, such as described and claimed in copending application, Oliver, Ser. No. 316,033, filed Oct. 14, 1963, now abandoned, and commonly assigned. The collector is also connected to a choke coil 468. The choke coil 468 may, for example, have an inductance of 5 microhenries. The choke coil 468 is connected to the output terminal $O_2$ of the transmitter.

The lead 432 is connected to the output terminal $O_1$ of the transmitter through resistors 470 and 472. The output terminal $O_1$ is connected to the resistor 472. The common junction of resistors 470 and 472 is connected back to the bridge network 410.

In the transmitter circuit, the alternating current signal appearing across the inductance coil 446 is induced into the winding 454, and the resulting voltage across the winding 454 is amplified by the direct current amplifier transistors 460 and 462. The full-wave rectifier formed by the diodes 456 and 458 provides a frequency doubling effect, for the purpose explained above.

The amplified signal, in accordance with the voltage boost concepts of the invention described and claimed in the copending application, Oliver, Ser. No. 316,033, filed Oct. 14, 1963, now abandoned, and commonly assigned, is rectified in the circuit 466, and the rectified signal is introduced to the amplifier 420 in series with the voltage from the power supply 28 (FIGURE 1) at the control room area.

In the operation of the transmitter of FIGURE 5, the aforesaid variations in the transducer 20 causes amplitude modulations of the alternating current signal amplified by the amplifier 420. The resulting output signal is rectified, as described above, so that a direct current flows in the circuit of the output terminal $O_1$ and resistors 470 and 472, and other circuitry, as explained in the copending application, Miller et al., Ser. No. 315,997, filed Oct. 14, 1963, and commonly assigned.

As described above, the resulting variations in the direct current flow produces corresponding voltage variations across the precision resistor 30 (FIGURE 1) in the control room area. The transmitter circuit is particularly advantageous in that the operation is current regulated and is not affected by changes in the lead length resistance. This means that no lead resistance adjustments are required. Moreover, as mentioned above, since the transmitter circuit responds to a direct current flow, the system is exceptionally immune to alternating current pick-up and line transients.

A test jack 474 may be connected across the resistor 470. This test jack may also provide a communication means, in that it can serve as a plug-in point for voice communication between the process area and the central control room. An intercom telephone handset/headset may be used in the process area, and an intercom receiver may be connected across the resistor 30 in the control room area.

The communications link operates over the same pair of wires 26 (FIGURE 1) used for instrument transmission. Voice messages can be transmitted simultaneously with the measurement and control signals, without in any way disturbing instrument operation. The resulting inter-communication network is economically practical since it does not require the installation of additional wire lines. This intercom network is particularly useful in day-to-day operations, and it is especially advantageous during start-ups, whmen field adjustments must be rapidly correlated with the control result.

The invention provides, therefore, an improved process control system for providing automatic control for industrial processes, and the like.

As described above, the improved process control system of the present invention is particularly advantageous in that it utilizes a two-wire communication link between the process area and the control room area. This two-wire link, however, in accordance with the concepts of the present invention, does not necessitate the incorporation of all the components of the system into a series loop. Rather, the control room area components are connected in parallel into the circuit, so that these components may be added to or removed from the system without affecting the operation of the system as a whole. This concept, as explained above, increases the flexibility of the system.

In addition, the improved control system of the present invention is constructed to utilize a common power supply for all the components of the system, so as to simplify the inter-connections between the components to a large extent, as compared with the prior art systems. In addition, the power supply operates on a common reference potential lead, and all voltages in the system have but one polarity referenced to that lead.

The improved ocntrol system of the present invention is also advantageous in that it is capable of incorporating intrinsic safety networks. This enables the equipment in the process area to be used in atomspheres which are inherently hazardous, and without the need for explosion-proof housing, or the like.

The improved system of the present invention is also compatible with different types of components. This compatibility is achieved, as explained above, by the provision of simple adapter units.

Moreover, the imroved control system of the present invention includes components which are constructed to operate on signals of the elevated zero type. As described above, it is essential in the type of system of the present invention, that the signals be of the elevated zero type, rather than of the zero base type. The components of the system of the invention, are constructed to operate on the elevated zero type of signals, without the requirements for precise power consuming corrective circuits, or the like.

It is evident that although a particular embodiment of the control system of the persent invention has been shown and described, modifications may be made. It is intended in the accompanying claims to cover all such modifications which fall within the scope of the invention.

We claim:

1. An electronic system for controlling a variable parameter of a process, said system including in combination: signal transmitting equipment adapted to be located at a process area and including sensing means responsive to changes in said parameter to provide a signal having variations representative of the parameter changes; a control element for controlling said process parameter at the process area; utilization means adapted to be located remotely from said transmitting equipment and including remote control means plus at least one of a group of units consisting of an indicator, a recorder, an alarm and a computer; a first pair of signal lines to provide a path for transmission of said signal between said transmitting equipment and said utilization equipment; a second pair of signal lines to provide a path for transmission of control signals from said remote control means to said control element; intrinsic safety means connected to each of said pairs of signal lines for limiting current flow therein; and a direct current power supply connected to said utilization equipmen tand connected by said first pair of signal lines to said transmitting equipment, said power supply constituting the only source of DC power for said system.

2. A process monitoring system,
including in combination,
process area equipment having a transducer for sensing the status of a process variable parameter and a transmitter having two output terminals and responsive to said transducer sensed status to provide a current path between said terminals having an electrical operational state which is an analog of said sensed status for permitting a current flow indicative of such sensed status,
control area equipment remote from the process area and having a power supply with first and second terminals and supplying a voltage thereacross,
first and second electrical conductors extending between said equipment and respectively connected to said output terminals,
impedance means having one end connected to said first terminal and another end connected to said first electrical conductor,
said second terminal connected to said second electrical conductor with power flowing to said transmitter for actuating same through said electrical conductors with an electrical current amplitude varying in accordance with said operational state,
and utilization means in said control area equipment connected across said impedance means and responsive to a voltage developed thereacross which is indicative of current flow through said electrical conductors to perform a function in accordance with said sensed status.

3. The system of claim 2 wherein said first terminal is connected to a reference potential common to said utilization means and said power supply and said current flow through said impedance means always being greater than zero amplitude such that a reference status of said variable parameter is indicated by a non-zero voltage across said impedance means.

4. The system of claim 3 further including intrinsic safety means having a resistor in series with each conductor capable of limiting current flowing therethrough to an amplitude safe in a hazard area.

5. The system of claim 3 further including voice communication means connected to said two conductors.

6. The system of claim 5 wherein said voice communication means includes a fixed resistor connected in series with said conductors and across which voice communication signals are produced.

7. The system of claim 4 wherein said power supply provides a constant direct current voltage across said terminals with all electrical power to said equipments being supplied by said power supply.

8. The system of claim 7 further including a battery in said power supply means for use as a source of standby power.

9. The system of claim 2 wherein said impedance means comprises a precision resistor and said utilization means comprising a plurality of voltage responsive equipments, each having input portions connected directly across in parallel circuit relationship to said precision resistor and each of said equipments being responsive to a voltage developed across said resistor to perform a function.

10. An electronic system for monitoring a variable parameter of a process, said system including in combination:
signal transmitting equipment including sensing means responsive to changes in said parameter to provide a signal path having dynamic electrical impedance variations representative of parameter changes;
utilization equipment adapted to be located at a control center and including at least one of a group of units consisting of a controller, an indicator, a recorder and an alarm and a computer;
a pair of signal lines providing a transmission path between said transmitting equipment (including said signal path) and said utilization equipment and for supplying power from said control center to said transmitting equipment;
a direct current power supply located with said utilization equipment and which constitutes the only source of electrical power for the system, said power supply having connections for supplying power to said utilization equipment and also for supplying power to said transmitting equipment over said pair of signal lines;
impedance means electrically interposed between said power supply and one of said signal lines;
each of said utilization equipments having an input portion, all of said input portions of the respective equipments being connected in parallel circuit relation across said impedance means; and
changes in electrical impedance presented to said power supply through said signal lines and therefore, any changes in amplitude of current flowing through said signal lines and said impedance means being determined by the dynamic electrical impedance of said signal path.

11. The subject matter of claim 10 wherein said impedance means is an electrical resistor having an electrical impedance in the order of magnitude of 250 ohms.

References Cited

UNITED STATES PATENTS

| | | | |
|---|---|---|---|
| 2,895,502 | 7/1959 | Roper et al. | 340—187 |
| 2,949,273 | 8/1960 | Roper et al. | 340—187 |
| 3,117,310 | 1/1964 | Roper et al. | 340—187 |
| 3,193,710 | 7/1965 | Elliot | 307—136 |
| 3,229,276 | 1/1966 | Harple et al. | 340—181 |
| 3,268,867 | 8/1966 | Pickett et al. | 340—171 |

FOREIGN PATENTS 581,236  5/1931  Germany.

JOHN W. CALDWELL, *Primary Examiner.*

NEIL C. READ, THOMAS B. HABECKER, *Examiners.*

D. YUSKO, *Assistant Examiner.*